(12) United States Patent
Inagaki

(10) Patent No.: US 9,467,773 B2
(45) Date of Patent: Oct. 11, 2016

(54) ELECTRONIC DEVICE

(71) Applicant: KYOCERA CORPORATION, Kyoto (JP)

(72) Inventor: Tomohiro Inagaki, Yokohama (JP)

(73) Assignee: KYOCERA Corporatiion, Kyoto (JP)

( * ) Notice: Subject to any disclaimer, the term of this patent is extended or adjusted under 35 U.S.C. 154(b) by 0 days.

(21) Appl. No.: 14/397,947

(22) PCT Filed: May 14, 2013

(86) PCT No.: PCT/JP2013/003073
§ 371 (c)(1),
(2) Date: Oct. 30, 2014

(87) PCT Pub. No.: WO2013/172019
PCT Pub. Date: Nov. 21, 2013

(65) Prior Publication Data
US 2015/0131816 A1  May 14, 2015

(30) Foreign Application Priority Data

May 14, 2012 (JP) .................................. 2012-110961

(51) Int. Cl.
| | |
|---|---|
| H04R 25/00 | (2006.01) |
| H04R 1/46 | (2006.01) |
| H04M 1/03 | (2006.01) |
| H04R 1/02 | (2006.01) |
| H04R 7/04 | (2006.01) |

(Continued)

(52) U.S. Cl.
CPC .............. *H04R 1/46* (2013.01); *H04M 1/0266* (2013.01); *H04M 1/03* (2013.01); *H04M 1/0216* (2013.01); *H04R 1/02* (2013.01); *H04R 7/04* (2013.01); *H04R 17/00* (2013.01); *H04R 25/606* (2013.01); *H04R 2499/11* (2013.01)

(58) Field of Classification Search
CPC ........ H04R 1/02; H04R 1/28; H04R 17/005; H04R 17/0025; H04R 2400/01; H04R 2400/03
USPC ....... 381/150, 162, 190, 191, 396, 386, 388, 381/333, 306
See application file for complete search history.

(56) References Cited

U.S. PATENT DOCUMENTS

| | | | |
|---|---|---|---|
| 5,410,605 A * | 4/1995 | Sawada et al. ............ | 381/71.14 |
| 6,785,393 B2 * | 8/2004 | Lipponen et al. ............ | 381/191 |

(Continued)

FOREIGN PATENT DOCUMENTS

| | | | | |
|---|---|---|---|---|
| FI | WO 2012025783 A1 * | 3/2012 | ............ | G06F 3/016 |
| JP | H05-11783 A | 1/1993 | | |
| JP | H05-22382 A | 1/1993 | | |

(Continued)

OTHER PUBLICATIONS

International Search Report; PCT/JP2013/003073; Aug. 20, 2013.

(Continued)

*Primary Examiner* — Sunita Joshi
(74) *Attorney, Agent, or Firm* — Studebaker & Brackett PC

(57) ABSTRACT

There is provided an electronic device 1 that allows a user to listen to vibration sound that is transmitted when a vibrator 10 held in a housing 60 is pressed against the user's body and a part of the use's body is vibrated. The electronic device 1 has a microphone 7 and vibrates the vibrator 10 based on ambient sound collected by the microphone 7.

25 Claims, 12 Drawing Sheets

(51) Int. Cl.
*H04R 17/00* (2006.01)
*H04M 1/02* (2006.01)

(56) References Cited

U.S. PATENT DOCUMENTS

| | | | | |
|---|---|---|---|---|
| 7,050,600 B2 * | 5/2006 | Saiki et al. | ............ | 381/388 |
| 2012/0237075 A1 * | 9/2012 | East | ............ | H04R 1/1066 |
| | | | | 381/381 |

FOREIGN PATENT DOCUMENTS

| JP | H06-6246 A | 1/1994 |
|---|---|---|
| JP | H09-36940 A | 2/1997 |
| JP | H11-259078 A | 9/1999 |
| JP | 2003-037651 A | 2/2003 |
| JP | 2003-143253 A | 5/2003 |
| JP | 2004-187031 A | 7/2004 |
| JP | 2005-348193 A | 12/2005 |
| JP | 2007-019898 A | 1/2007 |
| JP | 2007-082009 A | 3/2007 |
| JP | 2011-091719 A | 5/2011 |

OTHER PUBLICATIONS

Written Opinion of the International Searching Authority; PCT/JP2013/003073; Aug. 20, 2013; with concise explanation.

* cited by examiner

ELECTRONIC DEVICE

CROSS REFERENCE TO RELATED APPLICATION

This application claims priority to and the benefit of Japanese Patent Application No. 2012-110961 filed on May 14, 2012, the entire contents of which are incorporated herein by reference.

TECHNICAL FIELD

The present invention relates to an electronic device configured to allow a user to listen to vibration sound that is transmitted when a vibrator held in a housing is pressed against the user's body and a part of the user's body is vibrated.

BACKGROUND ART

Patent Literature 1 discloses an electronic device such as a mobile phone that transmits air conduction sound and bone conduction sound to the user. In addition, Patent Literature 1 states that the air conduction sound is sound transmitted to the user's auditory nerve when vibration of the air caused by vibration of an object passes through the external auditory meatus to the tympanic membrane, and the tympanic membrane vibrates. Patent Literature 1 further states that the bone conduction sound is sound transmitted to the user's auditory nerve through a part of the user's body (e.g. the cartilage of external ear) being is in contact with a vibrating object.

In the telephone described in Patent Literature 1, a rectangular plate-like vibrator made of piezoelectric bimorph and flexible substance is attached to the outer surface of a housing through an elastic member. Patent Literature 1 also states that, when a voltage is applied to the piezoelectric bimorph of the vibrator, the piezoelectric material expands and contracts in a longitudinal direction, which causes the vibrator to bend and vibrate, and when the user brings his/her auricle into contact with the vibrator, air conduction sound and bone conduction sound are transmitted to the user.

CITATION LIST

Patent Literature

PTL 1: JP2005348193 (A)

SUMMARY OF INVENTION

Technical Problem

In the electronic device disclosed in Patent Literature 1, a vibrator is attached to the outer surface of a housing of a mobile phone or the like, and the vibrator is vibrated to allow the user to listen to the sound. Thus, the user cannot listen to the sound unless he/she securely presses the vibrator against his/her ear. Furthermore, in that case, if the user covers his/her ear with an electronic device, the ambient sound can be blocked out, and articulation of the listening sound under the noise can be improved. However, if the ear is covered with the housing, in the case of a telephone, for example, the speaking sound of the user (speaker) is hard to be released from his/her ear, and the user will have oppressive feeling It is an object of the present invention to provide an electronic device that can solve the above-described problem and alleviate the oppressive feeling.

Solution to Problem

The electronic device according to the present invention is an electronic device configured to allow a user to listen to vibration sound that is transmitted when a vibrator held in a housing is pressed against the user's body and a part of the user's body is vibrated. The electronic device includes a microphone and vibrates the vibrator based on the ambient sound collected by the microphone.

The vibrator may be pressed with a pressing force in the range from 3N to 10N.

When the ambient sound collected by the microphone is equal to or less than a predetermined value, the vibrator may be vibrated based on the ambient sound collected by the microphone.

When the ambient sound collected by the microphone is more than the predetermined value, vibration of the vibrator based on the ambient sound collected by the microphone may be stopped or reduced.

The electronic device has a contact area detection function for detecting an area of contact of a contact object with the vibrator or a pressure detection function, and when the area of contact detected by the contact area detection function or the pressure detection value detected by the pressure detection function is more than a predetermined value, the vibrator may be vibrated based on the ambient sound collected by the microphone.

When the area of contact detected by the contact area detection function or the pressure detection value detected by the pressure detection function is equal to or less than a predetermined value, vibration of the vibrator based on the ambient sound collected by the microphone may be stopped or reduced.

Based on the ambient sound collected by the microphone, the vibrator may be vibrated with opposite phase to that of the ambient sound.

The vibrator may be vibrated by adjusting its phase, for each frequency band of the ambient sound, to be in opposite phase of the ambient sound.

The electronic device has a telephone communication function, and during telephone communication by the telephone communication function, the vibrator may be vibrated based on the ambient sound collected by the microphone.

The microphone that collects the ambient sound may be a sub-microphone disposed on a position different from that where a main microphone for speech transmission is disposed.

The main microphone is disposed in such a manner that it has a directivity on the side facing the vibrator of the housing, and the sub-microphone may be disposed in such a manner that it has a directivity on the opposite side to the main microphone.

The vibrator has a piezoelectric element and a panel that supports the piezoelectric element, and the panel may be held by the housing.

The piezoelectric element may be disposed on one end side in one direction of the housing.

The panel is formed in a rectangular shape in planar view, and the length of one of two sides opposed to each other thereof may be equal to or more than the length from the antitragus to the inferior crus of antihelix.

In the panel, the length of other two sides opposed to each other may be equal to or more than the length from the tragus to the antihelix.

The piezoelectric element may be joined to the housing with a joining member and fixed thereto.

The joining member may be a non-thermosetting adhesive.

The joining member may be a double-sided adhesive tape.

The panel may be joined to the housing with a joining member.

The joining member that joins the panel to the housing may be a non-thermosetting adhesive.

The joining member that joins the panel to the housing may be a double-sided adhesive tape.

The panel may form a part or all of a display unit, an input unit and a cover for the display unit.

The portion on the panel where the piezoelectric element is fixed may be located outside the region of the panel overlapped with the display unit in planar view.

The display unit may be fixed to the panel from inside the housing.

The vibrator may allow the user to listen to air conduction sound, in addition to vibration sound.

In the electronic device according to the present invention, oppressive feeling can be alleviated.

DESCRIPTION OF EMBODIMENTS

The following describes embodiments of the present invention in detail with reference to the drawings.

First Embodiment

Figure 1:
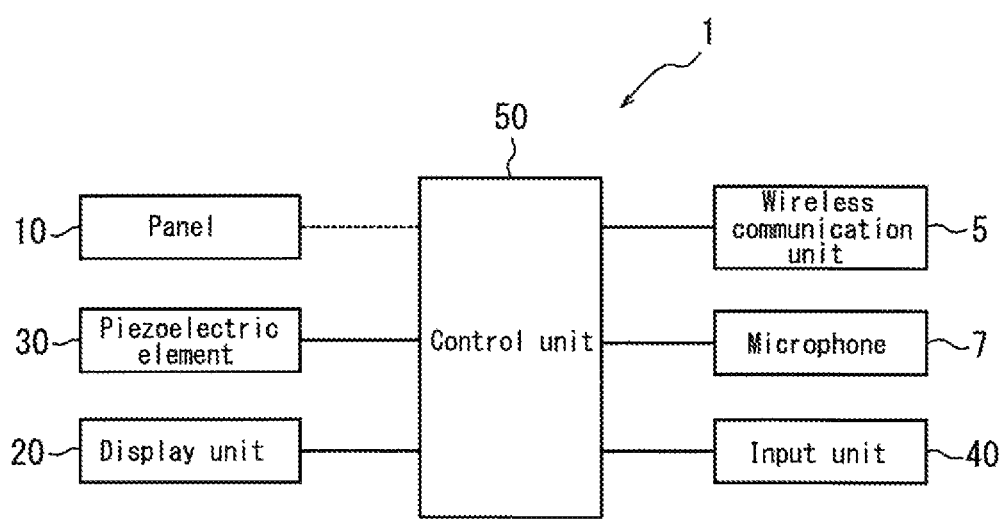
FIG. 1 is a diagram illustrating a function block of main parts of an electronic device according to a first embodiment.

FIG. 1 is a diagram illustrating a function block of main parts of an electronic device 1 according to a first embodiment of the present invention. The electronic device 1 is, for example, a mobile phone provided with a telephone communication function, and includes a wireless communication unit 5, a microphone 7, a panel 10, a display unit 20, a piezoelectric element 30, an input unit 40 and a control unit 50. The wireless communication unit 5 has a known configuration, and is connected to the communication network wirelessly through a base station or the like. The microphone 7 is a known microphone such as a condenser microphone, and collects speech voice or the like uttered by the user during telephone communication through the wireless communication unit 5.

The panel 10 is, for example, a touch panel that detects contact or a cover panel that protects the display unit 20 or the like. The panel 10 is made of, for example, glass or synthetic resin such as acrylic or the like. The panel 10 may be in the form of plate. The panel 10 may be a flat plate or a curved panel having a smoothly inclined surface. When the panel 10 is a touch panel, it detects contact with a finger of the user, a pen or a stylus pen or the like. As a detection method of the touch panel, any detection type such as a capacitive type, a resistive film type, a surface acoustic wave type (or an ultrasonic wave type), an infrared type, an electromagnetic induction type, a load detection type or the like may be used.

The display unit 20 is a display device such as a liquid crystal display, an organic EL display, or an inorganic EL display or the like. The display unit 20 is provided on the back side of the panel 10. For example, the display unit 20 is provided on the back side of the panel 10 with a joining member (e.g. an adhesive). Alternatively, the display unit 20 is separated from the panel 10 and is supported by the housing of the electronic device 1.

The piezoelectric element 30 is an element that expands and contracts or curves (bends) in accordance with an electromechanical coupling coefficient of the component material, when an electrical signal (voltage) is applied. These elements are made of ceramic or crystal. The piezoelectric element 30 may be a unimorph, bimorph, or laminated piezoelectric element. The laminated piezoelectric element includes a laminated unimorph element with layers of unimorph (e.g. 16 or 24 layers) and a laminated bimorph element with layers of bimorph (e.g. 16 or 24 layers). The laminated type piezoelectric element is configured with a laminated structure formed by a plurality of dielectric layers composed of, for example, PZT (lead zirconate titanate) and electrode layers disposed between the dielectric layers. The unimorph expands and contracts when an electrical signal (voltage) is applied and the bimorph curves when an electrical signal (voltage) is applied.

The piezoelectric element 30 is disposed on the back side of the panel 10 (the surface on the inner side of the electronic device 1). The piezoelectric element 30 is attached to the panel 10 with a joining member (e.g. a double-sided adhesive tape). The piezoelectric element 30 may be attached to the panel 10 through an intermediate member (e.g. a metal plate). The piezoelectric element 30 is, in a state where it is disposed on the back side of the panel, separated from the surface on the inner side of the housing by a predetermined distance. The piezoelectric element 30 may preferably, even in a state where it expands/contracts or curves, be separated from the surface of inner side of the housing by a predetermined distance. That is, the distance between the piezoelectric element 30 and the surface of inner side of the housing may preferably be larger than the maximum deformation amount of the piezoelectric element 30.

The input unit 40 receives an operation input from the user, and is formed by an operation button (operation key), for example. Note that when the panel 10 is a touch panel, the panel 10 may also receive an operation input from the user by detecting a contact by the user.

The control unit 50 is a processor that controls the electronic device 1. The control unit 50 processes, during telephone communication, a voice signal collected by the microphone 7 and subjected to electroacoustic conversion, and transmits the signal from the wireless communication unit 5. In addition, the control unit 50 applies a predetermined electrical signal (pressure corresponding to acoustic signals such as voice of the corresponding party, side tone, incoming melody or songs including music, or the like) to the piezoelectric element 30. Note that, the voice signal may be based on the music data stored in the internal memory or may be one that is generated by playing the music data stored in the external server or the like through the network.

When an electrical signal is applied to the piezoelectric element 30, the piezoelectric element 30 expands and contracts or curves in a longitudinal direction. At this time, the panel 10 to which the piezoelectric element 30 is attached deforms in response to expansion/contraction or curve of the piezoelectric element 30, and the panel 10 curves and vibrates. Here, the maximum voltage of the electrical signal applied from the control unit 50 to the piezoelectric element 30 may be ±15V, which is higher than what is called an applied voltage of a panel speaker, which is ±5V, applied for the purpose of conduction of sound by air conduction sound, not by vibration sound. Thus, even if the user presses the panel 10 against his/her body with a force of, for example, 3N or more (5N to 10N), the panel 10 can generate sufficient curve and vibration, and can generate vibration sound transmitted through a part of the user's body (e.g. cartilage of the outer ear). Note that the applied voltage can be adjusted appropriately based on the fixing strength of the panel 10 on the housing or the supporting member, or the performance of the piezoelectric element 30.

When the control unit 50 applies an electrical signal to the piezoelectric element 30, the piezoelectric element 30 expands and contracts or curves in a longitudinal direction. At this time, the panel 10 to which the piezoelectric element 30 is attached deforms in response to the expansion/contraction or curve of the piezoelectric element 30, and the panel 10 vibrates. The panel 10 curves in response to the expansion/contraction or curve of the piezoelectric element 30. The panel 10 is bent directly by the piezoelectric element 30. The "panel 10 is bent directly by the piezoelectric element" is different from a phenomenon in which a specific region of a panel is vibrated due to inertial force of a piezoelectric actuator formed by disposing a piezoelectric element in a casing, and the panel is deformed, which is employed by the conventional panel speakers. The "panel 10 is bent directly by the piezoelectric element" means that the expansion/contraction or bend (curve) of the piezoelectric element bends the panel directly through the joining member or through the joining member and a reinforcing member 80 described later.

Thus, the panel 10 generates air conduction sound and, when the user brings a part of his/her body (e.g. cartilage of the outer ear) into contact with the panel, generates human body vibration sound transmitted through a part of the body. For example, the control unit 50 can apply, for example, an electrical signal in response to a voice signal relating to the voice of the corresponding party to the piezoelectric element 30, and causes the piezoelectric element 30 to generate air conduction sound and human body vibration sound corresponding to the voice signal.

The panel 10 curves and vibrates not only a region to which the piezoelectric element 30 is attached but also a region apart from the region to which the piezoelectric element 30 is attached. The panel 10 has, in a vibration region, a plurality of portions that vibrate in a direction crossing a main face of the panel 10, and at each of the portions, the value of amplitude of the vibration changes from plus to minus or vice versa with time. The panel 10 vibrates, at a certain moment, in such a manner that a portion where the amplitude of vibration is relatively large and a portion where the amplitude of vibration is relatively small are distributed almost all over the panel randomly or periodically at a glance. That is, a plurality of wave vibrations are detected all over the panel 10. Even if the user presses the panel 10 against his/her body with a force in the range from 5N to 10N, for example, in order to prevent the above-described vibration of the panel 10 from being damped, the maximum voltage applied from the control unit 50 to the piezoelectric element 30 may be ±15V. Thus, the user can listen to the sound by bringing his/her ear into contact with the region apart from the above-described region to which the piezoelectric element 30 is attached, for example, the central region of the panel 10.

Figure 2:
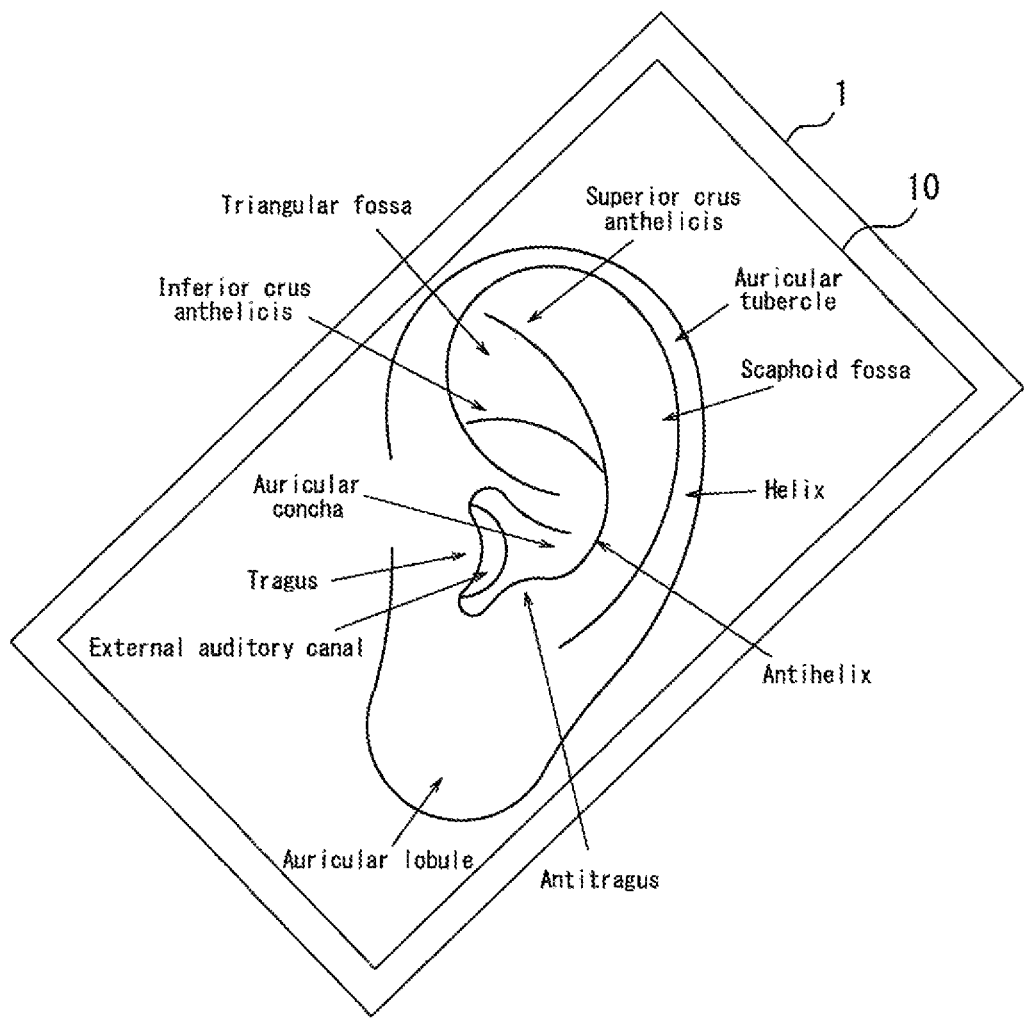
FIG. 2 is a diagram illustrating a preferred shape of a panel.

Here, the panel 10 may have almost the same size as that of the user's ear, or the panel 10 may be larger than the user's ear, as illustrated in FIG. 2. In this case, when the user listens to sound, it is likely that the whole ear is covered with the panel 10 of the electronic device 1, thereby preventing the ambient sound (noise) from entering easily into the external auditory canal. In the panel 10, a region larger than a region having a length corresponding to the distance from the inferior crus of antihelix (inferior crura antihelix) to the antitragus and a width corresponding to the distance from the tragus to the antihelix may be vibrated. Preferably, a region having a length corresponding to the distance from a part near the superior crus of antihelix (superior crus antihelix) of the helix to the auricular lobule and a width corresponding to the distance from the tragus to a part near the antihelix of the helix may be vibrated. The region having the above-described length and width may be formed in a rectangular shape or in an oval shape having a major axis of the above-mentioned length and a minor axis of the above-mentioned width. The average size of Japanese person's ear can be looked up in sources such as the Japanese Body Dimension Database (1992-1994) or the like gathered by the Research Institute of Human Engineering for Quality Life (HQL). Note that, if the size of the panel 10 is equal to or larger than the average size of Japanese person's ear, panel 10 may cover a whole ear of a foreigner. If the panel 10 has the above-described dimension and shape, the panel 10 can cover the user's ear and will be tolerable for displacement when the panel is applied to the user's ear.

The above-described electronic device 1 can, due to vibration of the panel 10, transmit air conduction sound and vibration sound transmitted through a part of the user's body (e.g. cartilage of the outer ear). Thus, when the sound of the same volume as that of the conventional dynamic receiver is output, the sound transmitted to the ambient of the electronic device 1 due to vibration of the air caused by vibration of the panel 10 is smaller than that of the dynamic receiver. Therefore, this is suitable for the case where the user listens to a recorded massage in a train or the like, for example.

In addition, the above-described electronic device 1 transmits vibration sound by vibration of the panel 10. Thus, for example, when the user wears an earphone or a headphone, the user can listen to sound through the earphone or the headphone and a part of his/her body by bringing the earphone or the headphone into contact with the electronic device 1.

The above-described electronic device 1 transmits sound to the user by vibration of the panel 10. Thus, when the electronic device 1 has no dynamic receiver separately, it is not required to form an opening (sound emission port) for transmitting voice in the housing, thereby allowing for a simplified waterproof structure of the electronic device 1. Note that, when the electronic device 1 has a dynamic receiver, the sound emission port may be blocked by a member through which gas can pass but liquid cannot pass. The member through which gas can pass but liquid cannot pass is, for example, Gore-tex (registered trademark).

Figure 3A:
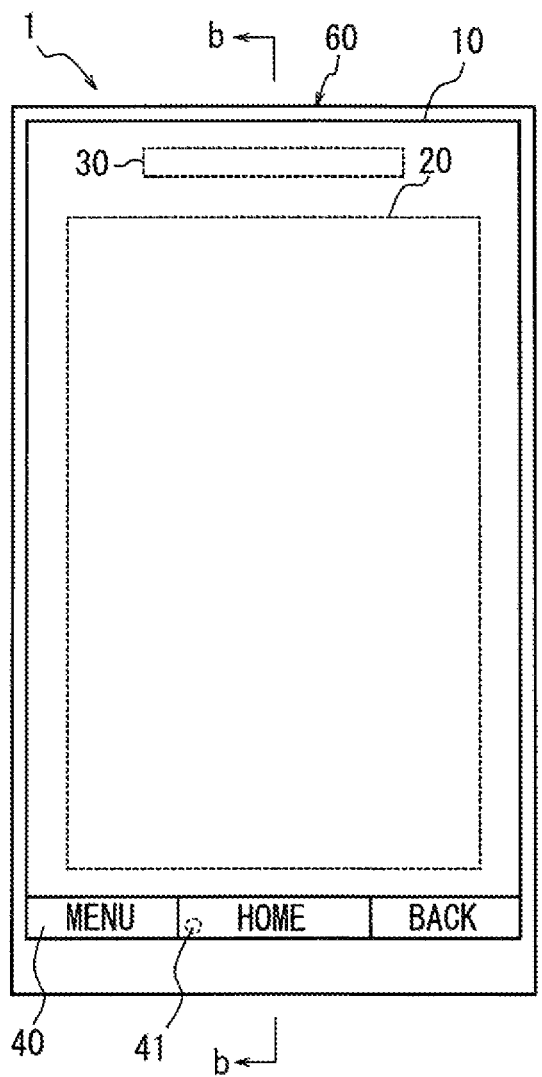
FIG. 3A is a diagram schematically illustrating main parts of mounting structure of the electronic device according to the first embodiment.
Figure 3B:
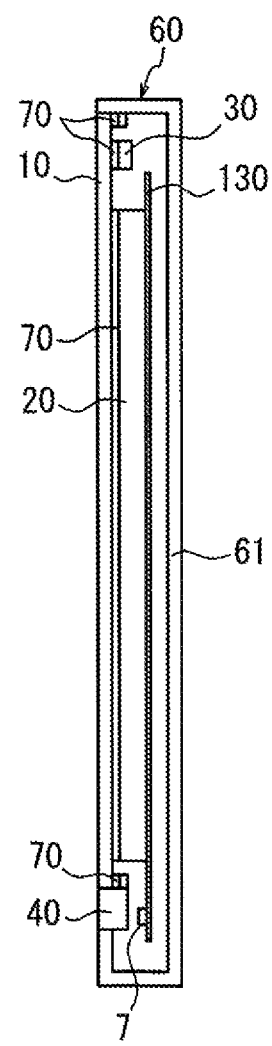
FIG. 3B is a diagram schematically illustrating main parts of mounting structure of the electronic device according to the first embodiment.

FIG. 3 is a diagram schematically illustrating main parts of mounting structure of the electronic device 1 according to the first embodiment. FIG. 3A is a front view and FIG. 3B is a cross-sectional diagram along line b-b in FIG. 3A. The electronic device 1 illustrated in FIG. 3 is a smartphone in which a rectangular glass plate is disposed as the panel 10 on the front surface of the housing 60 (e.g. metal or resin case).

The panel 10 is, for example, a capacitive type touch panel. The panel 10 is supported by the housing 60 through a joining member 70, and is configured in such a manner that it can be pressed with a pressing force in the range from 3N to 10N. In the panel 10, on the back side thereof excluding the one end side (upper portion) in a longitudinal direction, the display unit 20 is joined through the joining member 70. The display unit 20 is connected to the circuit board 130. In addition, on the upper back side, which is on one end side in one direction of the panel 10, the piezoelectric element 30, which forms the vibrator with the panel 10, is joined through the joining member 70. The piezoelectric element 30 is formed in a rectangular shape, and is joined such a manner that its longer side is located along the shorter side of the panel 10. Note that the joining member 70 is an adhesive having thermosetting or ultraviolet curable properties or the like, or a double-sided adhesive tape, and can be, for example, an optical elasticity resin which is clear or colorless acrylic ultraviolet curing adhesive.

The input unit 40 is supported by the housing 60 on the other end side (lower portion) in a longitudinal direction of the panel 10. In addition, on the input unit 40, as illustrated by a dashed line, a mouthpiece 41 for the microphone is formed. That is, the piezoelectric element 30 is disposed on the upper side of the rectangular housing 60 and the mouthpiece 41 is formed on the lower side thereof. The microphone 7 is mounted on the circuit board 130 in such a manner that it faces the mouthpiece 41. Therefore, the microphone 7 has directivity on the side facing the panel 10.

Figure 4:
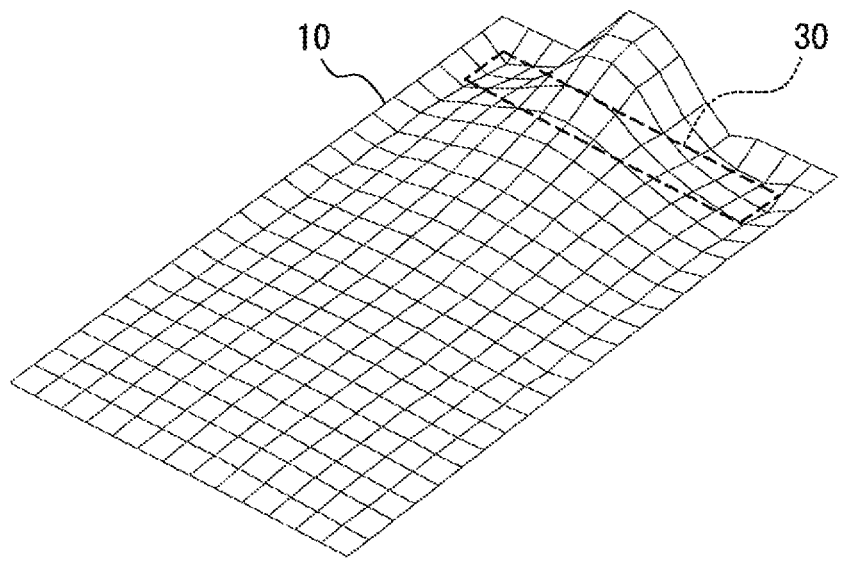
FIG. 4 is a diagram illustrating one example of vibration of the panel of the electronic device according to the first embodiment.

FIG. 4 is a diagram illustrating one example of vibration of the panel 10 of the electronic device 1 according to the first embodiment. In the electronic device 1 according to the first embodiment, the display unit 20 is attached to the panel 10. Thus, the lower portion of the panel 10 is hard to vibrate compared to the upper portion of the panel 10 to which the piezoelectric element 30 is attached. Therefore, at the lower portion of the panel 10, sound leakage due to vibration of the lower portion of the panel 10 can be reduced. In the panel 10, the upper portion thereof is bent directly by the piezoelectric element 30, and in comparison with the upper portion, vibration is damped at the lower portion. The panel 10 is bent by the piezoelectric element 30 such that, in the long side direction of the piezoelectric element 30, the portion right above the piezoelectric element 30 protrudes most compared to its surrounding.

Figure 5:
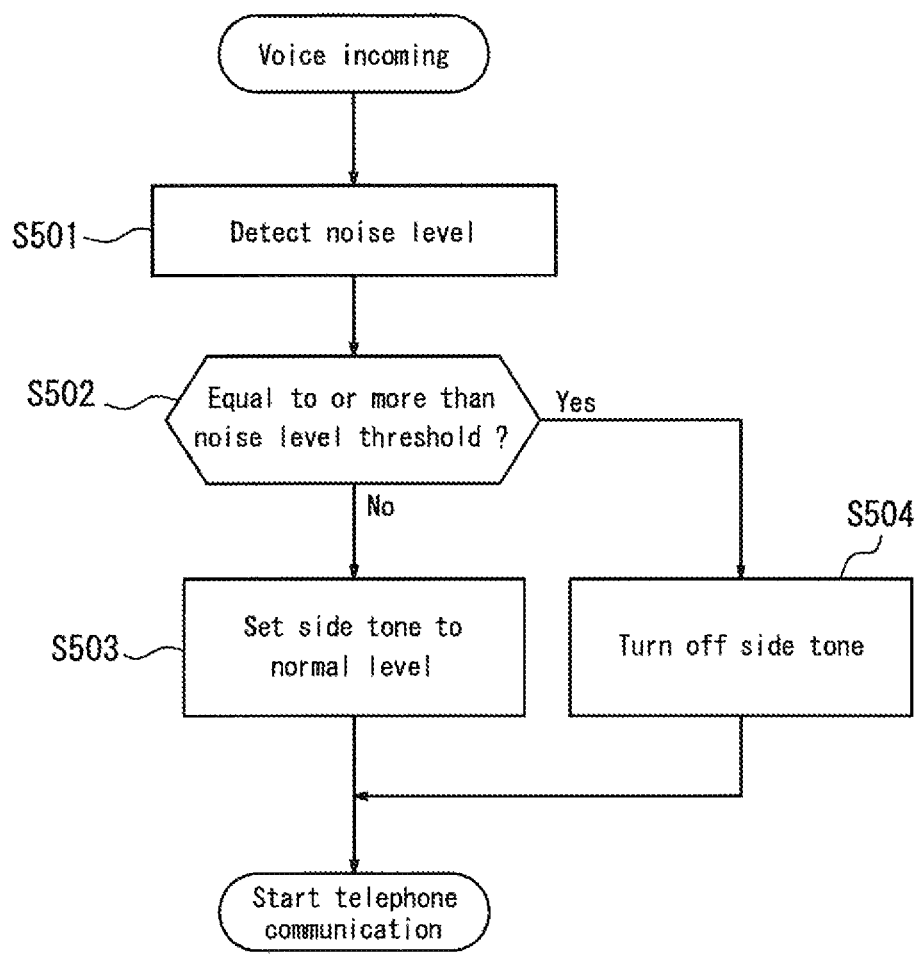
FIG. 5 is a flow chart illustrating an operation during telephone communication by the electronic device according to the first embodiment.

FIG. 5 is a flow chart illustrating an operation during telephone communication by the electronic device 1 according to the first embodiment. In the present embodiment, the control unit 50 detects, upon detection of an incoming of voice by the wireless communication unit 5, the noise level (ambient sound level) collected by the microphone 7 (step S501). The noise level can be detected, for example, by sampling the output signal of the microphone 7 for a certain period of time, and by performing a frequency analysis of the sampling output within a frequency band of the voice to be transmitted. Then, the control unit 50 determines whether or not the detected noise level is equal to or more than the threshold (step S502).

As a result thereof, if the noise level is less than the threshold (No), the control unit 50 sets the side tone to be generated by driving the piezoelectric element 30 to a normal level (step S503). That is, the control unit 50 vibrates the piezoelectric element 30 on the condition that the gain of the drive signal (side tone signal) of the piezoelectric element 30 based on the output signal of the microphone 7 is a normal (predetermined) gain.

On the other hand, if the noise level is equal to or more than the threshold (Yes), the control unit 50 turns off the side tone and causes the piezoelectric element 30 not to be driven by the output signal of the microphone 7 (step S504). After that, the control unit 50 starts communication through the wireless communication unit 5.

In this manner, in accordance with the electronic device 1 according to the present embodiment, the noise level collected by the microphone 7 is detected before starting communication, and when the noise level is less than the threshold, the side tone is set to a normal level, and when the noise level is equal to or more than the threshold, the side tone is turned off. Therefore, when the noise level is less than the threshold, the user can, even if he/she speaks with his/her ear covered with the panel 10, listen to ambient sound including his/her own speech voice as side tone, thus the oppressive feeling can be alleviated and the speech transmission performance can be improved as well. In addition, when the noise level is equal to or more than the threshold, the side tone is turned off, thus the articulation of the received speech voice under a noise can be improved.

In addition, in the panel 10, deformation of the panel 10 is caused by deformation of the piezoelectric element 30 attached to the back side of the panel 10, and a region from one end side in a longitudinal direction to which the piezoelectric element 30 is attached to the vicinity of the central portion vibrates sufficiently. Therefore, the user can listen to air conduction sound and vibration sound caused by vibration of the panel 10 by bringing a part of his/her body (e.g. cartilage of the outer ear) into contact with at least a portion of the region from the central portion to the upper portion of the panel 10. Thus, since air conduction sound and vibration sound can be transmitted to the user without protruding the vibrator out of the housing 60, usability is improved compared to that of the electronic device disclosed in Patent Literature 1 in which a vibrator which is much smaller than the housing is in contact with the human body. In addition, since it is not required for the user's ear to be in contact with the piezoelectric element itself, the piezoelectric element 30 is less damaged. Furthermore, when the housing 60, not the panel 10, is deformed, the user tends to drop a terminal when vibration is generated. However, when the panel 10 is vibrated, such matter is not likely to happen.

Moreover, in the present embodiment, the display unit 20 and the piezoelectric element 30 are joined to the panel 10 with the joining member 70. Thus the piezoelectric element 30 can be attached to the panel 10 in a state where the degree of freedom of displacement of the piezoelectric element 30 is hard to be impaired. In addition, the joining member 70 can be a non-thermosetting adhesive. This brings an advantage that shrinkage under heat stress is hard to occur between the piezoelectric element 30 and the panel 10 during curing. Furthermore, the joining member 70 can be a double-sided adhesive tape. This brings an advantage that shrinking stress is hard to be applied between the piezoelectric element 30 and the panel 10, unlike the case where an adhesive is used. In addition, the panel 10 is also joined to the housing 60 with the joining member 70, thus the same effect can be obtained, and in addition, the vibration from the panel 10 is hard to be transmitted directly to the cover member 62 of the housing 60. Thus, compared to the case where the housing itself vibrates greatly, it is less likely that the user drops the electronic device 1.

Second Embodiment

In accordance with the electronic device according to the second embodiment of the present invention, in the configuration of the electronic device 1 of the first embodiment, the phase of the side tone is an opposite phase that weakens ambient noise. Thus, the control unit 50 executes a side tone processing during telephone communication by the wireless communication unit 5.

Figure 6:
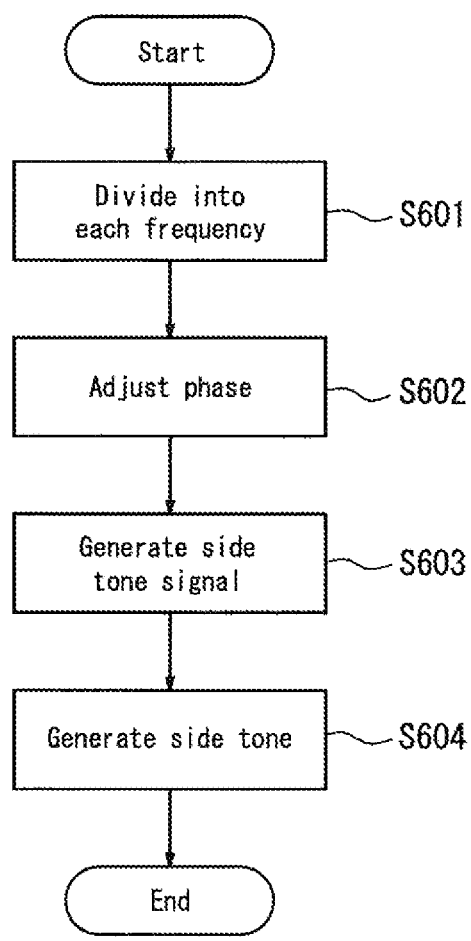
FIG. 6 is a flow chart illustrating a side tone processing during telephone communication by an electronic device according to a second embodiment.

FIG. 6 is a flow chart illustrating a side tone processing during telephone communication by the electronic device according to the second embodiment. In the side tone processing, first, the output signal of the microphone 7 is divided into each frequency band (step S601). Here, each frequency band can be appropriately set and, for example, the voice frequency band to be transmitted may be divided into 0 Hz to 500 Hz, 500 Hz to 1000 Hz, 1000 Hz to 1500 Hz, or the like. Next, the control unit 50 adjusts the phase of the output signal for each of the divided frequency bands in such a manner that it will be an opposite phase that weakens the noise (step S602). Note that the phase may be adjusted in such a manner that the output signal in each frequency band will be completely opposite, or will be partially opposite to weaken the noise on average.

After that, the control unit 50 combines the output signal of each frequency band whose phase is adjusted and generates a side tone signal (step S603). Then, the control unit 50 drives the piezoelectric element 30 based on the generated side tone signal and generates side tone in opposite phase that weakens ambient noise (step S604).

In this manner, in accordance with the electronic device 1 according to the present embodiment, the ambient noise collected by the microphone 7 is divided into each frequency band, and the phase of the side tone is adjusted to be in opposite phase to weaken the noise of divided each frequency band. Therefore, since the ambient noise can be reduced in real time, the oppressive feeling when the user communicates with his/her ear covered with the panel 10 can be alleviated effectively and the user can listen to his/her speech voice as side tone as well, thus the speech transmission performance can be improved. Note that, in the present embodiment, although the speech voice of the user is output as the side tone in opposite phase, the speech voice has nothing to do with the ambient noise. Thus no influence is given even if the phase is changed. The other configurations and operation and effect are the same as those of the first embodiment.

Third Embodiment

In accordance with the electronic device according to the third embodiment of the present invention, in the configuration of the electronic device 1 according to the first embodiment, the side tone level is adjusted in response to the contact area of the user's ear (contact object) with the panel 10. Thus, the control unit 50 has a detection function of a contact area of the contact object with the panel 10 and, during telephone communication by the wireless communication unit 5, executes an interruption processing of side tone based on the contact area of the contact object with the panel 10 detected by the contact area detection function.

Figure 7:
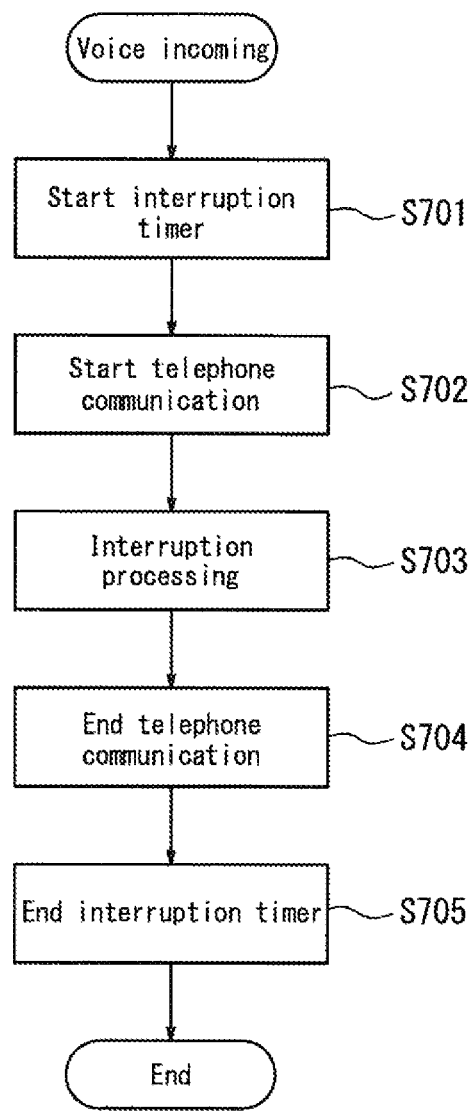
FIG. 7 is a flow chart illustrating an operation during telephone communication by an electronic device according to a third embodiment.

FIG. 7 is a flow chart illustrating an operation during telephone communication by the electronic device according to the third embodiment. In the present embodiment, the control unit 50 activates (starts), upon detection of the voice incoming, an interruption timer (step S701) and starts telephone communication through the wireless communication unit 5 (step S702).

After that, each time a period of time set by the interruption timer started in step S701 has elapsed, the control unit 50 executes the interruption processing (step S703). Then the control unit 50 terminates the communication (step S704) and terminates the interruption timer (step S705).

Figure 8:
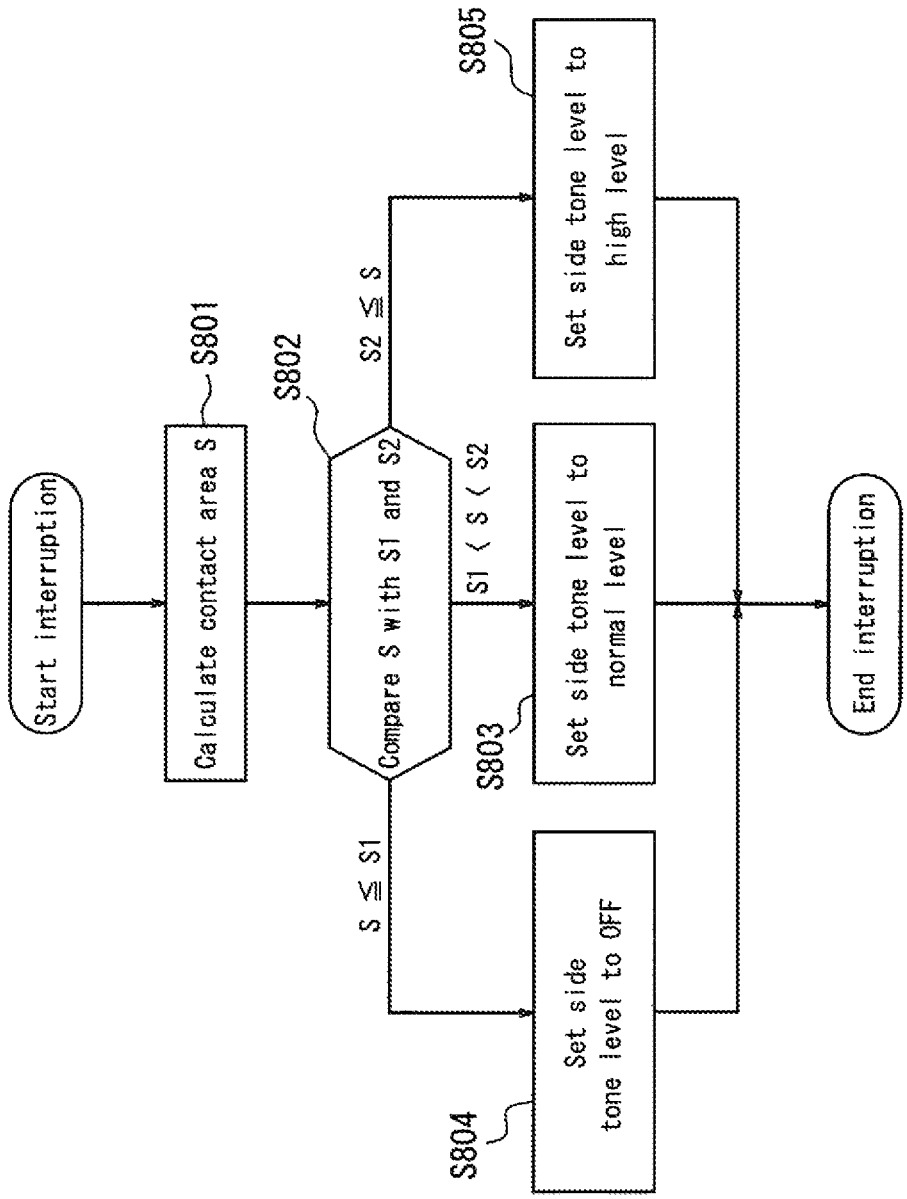
FIG. 8 is a flow chart illustrating an interruption processing in FIG. 7.

FIG. 8 is a flow chart illustrating the interruption processing executed in step S703 in FIG. 7. In the interruption processing, the control unit 50 detects the contact portion on the panel 10 first, and calculates the contact area (step S801). Next, the control unit 50 compares the calculated contact area S with the first threshold S1 and the second threshold S2 (S1<S2) (step S802).

As a result thereof, when S1<S<S2, the control unit 50 sets the side tone level generated by driving the piezoelectric element 30 to the normal (predetermined) level (step S803). That is, the control unit 50 sets the gain of the drive signal (side tone signal) of the piezoelectric element 30 based on the output signal of the microphone 7 as the normal (predetermined) gain.

On the other hand, when S≤S1, the control unit 50 turns off the side tone (step S804). That is, the control unit 50 controls such that the piezoelectric element 30 will not be driven based on the output signal of the microphone 7. On the other hand, when S2≤S, the control unit 50 sets the side tone level to the level which is higher than the normal level (step S805). That is, the control unit 50 sets the gain of the drive signal (side tone signal) of the piezoelectric element 30 based on the output signal of the microphone 7 to the gain which is higher than the normal (predetermined) gain.

In this manner, the electronic device 1 according to the present embodiment detects the contact area of the user's ear with the panel 10 during telephone communication and adjusts the side tone level in response to the contact area. That is, when the contact area of the panel 10 with the user's ear is in the normal range, ambient sound is easy to enter into the user's ear as air conduction sound, which may make it less likely for the user to feel the oppressive feeling. Thus the side tone level is set to a normal level. In addition, when the contact area is equal to or less than the normal range, it is easier for ambient sound to enter into the user's ear, which may make it further less likely for the user to feel the oppressive feeling. Thus the side tone is turned off. On the contrary, when the contact area is equal to or more than the normal range, the ear is covered with the panel 10 and it is hard for the ambient sound to enter into the user's ear as air conduction sound, which may make it likely for the user to feel the oppressive feeling. Thus the side tone level is set to be higher than the normal level, thereby allowing for output of the side tone in response to the contact state of the user's ear with the panel 10. Therefore the oppressive feeling can be alleviated and the speech transmission performance under noise can be improved as well. Other configurations and operation and effects are the same as those of the first embodiment.

Fourth Embodiment

Figure 9A:
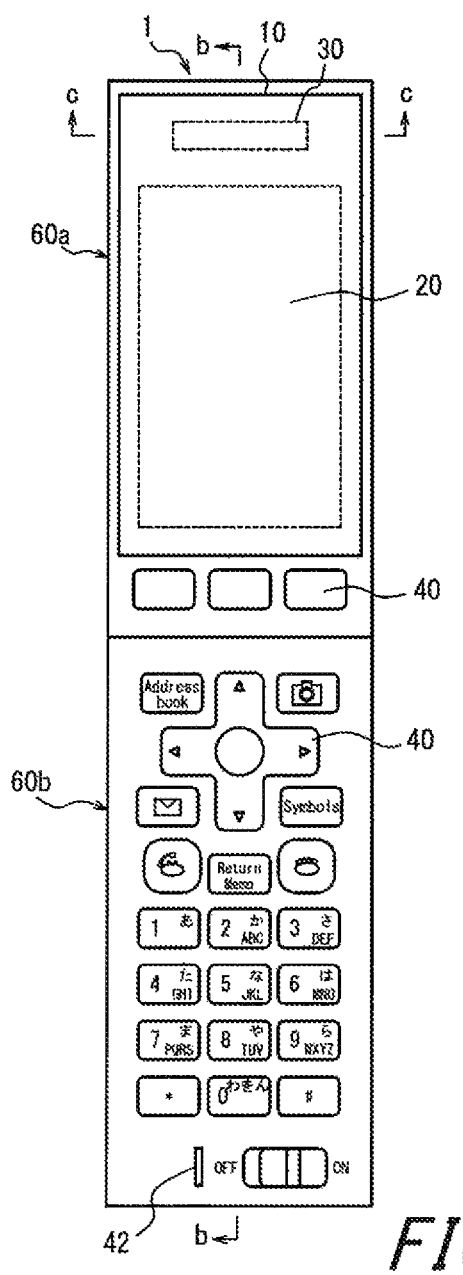
FIG. 9A is a diagram schematically illustrating main parts of mounting structure of an electronic device according to a fourth embodiment.
Figure 9B:
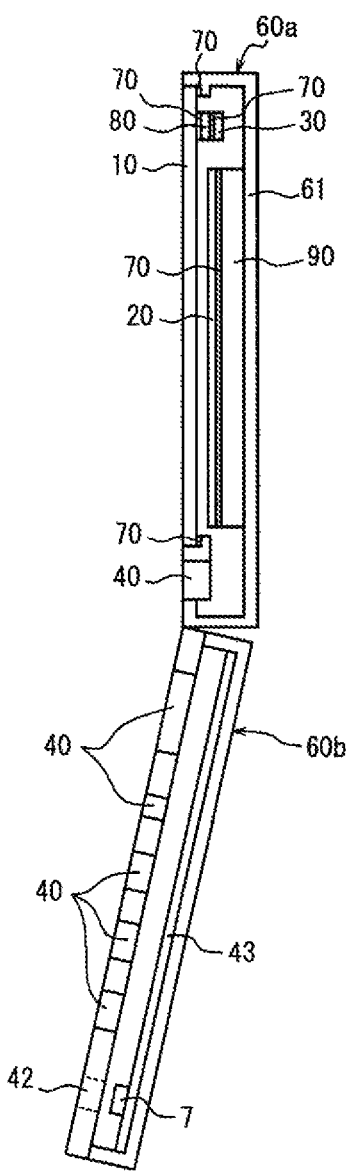
FIG. 9B is a diagram schematically illustrating main parts of mounting structure of the electronic device according to the fourth embodiment.
Figure 9C:
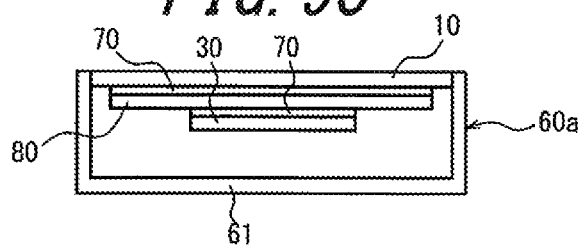
FIG. 9C is a diagram schematically illustrating main parts of mounting structure of the electronic device according to the fourth embodiment.

FIG. 9 is a diagram schematically illustrating main parts of mounting structure of an electronic device 1 according to a fourth embodiment. FIG. 9A is a front view, FIG. 9B is a cross-sectional diagram along line b-b in FIG. 9A, and FIG. 9C is a cross-sectional diagram along line c-c in FIG. 9A. The electronic device 1 illustrated in FIG. 9 is a folding mobile phone with a cover panel (acrylic plate) for protecting the display unit 20 as the panel 10 disposed on the front face on the upper side of the housing 60a and an input unit 40 disposed on the lower side of the housing 60b.

According to the fourth embodiment, a reinforcing member 80 is disposed between the panel 10 and the piezoelectric element 30. The reinforcing member 80 is a resin plate or a resin plate including, for example, sheet metal of glass fiber. That is, the electronic device 1 according to the fourth embodiment is configured by attaching the piezoelectric element 30 and the reinforcing member 80 with the joining member 70 and attaching further the reinforcing member 80 and the panel 10 with the joining member 70.

Furthermore, in the fourth embodiment, the display unit 20 is not attached to the panel 10, but is supported by the housing 60a. That is, in accordance with the electronic device 1 according to the second embodiment, the display unit 20 is separated from the panel 10, and the display unit 20 and the supporting unit 90, which is a part of the housing 60a, are attached with the joining member 70. Note that, the supporting unit 90 is not limited to a configuration in which it is provided as a part of the housing 60, and may be configured as a member made of metal or resin or the like, being independent of the housing 60.

A mouthpiece 42 is formed in the lower side housing 60b. In addition, in the housing 60b, a microphone 7 is mounted on the circuit board 4 built in the housing 60b, in such a manner that it faces the mouthpiece 42. Therefore, the microphone 7 has directivity on the side facing the input unit 40.

Figure 10:
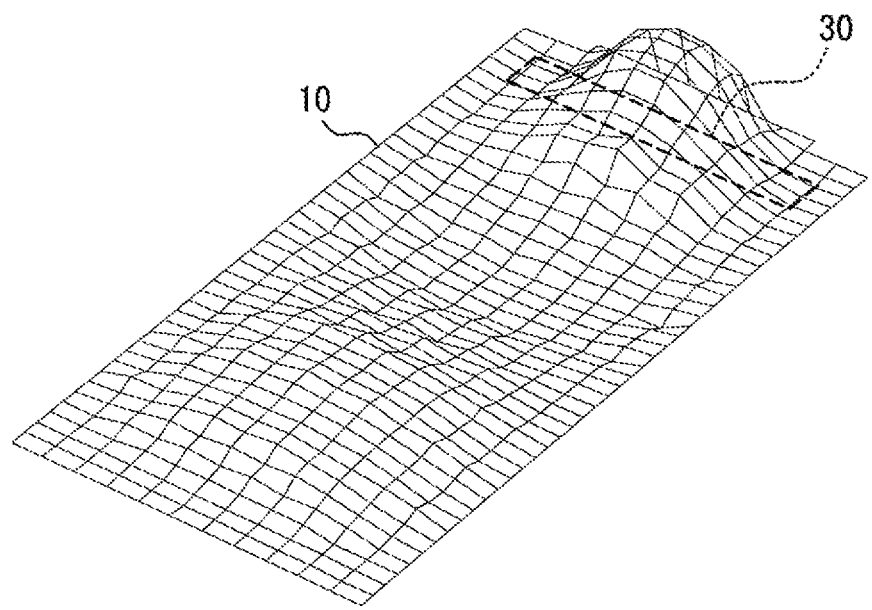
FIG. 10 is a diagram illustrating one example of the panel of the electronic device according to the fourth embodiment.

FIG. 10 is a diagram illustrating one example of vibration of the panel 10 of the electronic device 1 according to the fourth embodiment. In the electronic device 1 according to the fourth embodiment, the panel 10 is an acrylic plate that is less rigid than the glass plate. In addition, since the display unit 20 is not attached to the back side of the panel 10, the amplitude caused by the piezoelectric element 30 is larger than the electronic device 1 according to the first embodiment illustrated in FIG. 4. In addition, on the panel 10, the region to which the piezoelectric element 30 is attached vibrates and the region away from the attached region vibrates as well. Thus, the user can listen to, in addition to air conduction sound transmitted through the air, vibration sound by bringing his/her ear in contact with any position on the panel 10.

In accordance with the electronic device 1 according to the present embodiment, based on the ambient sound collected by the microphone 7, any of the side tone processing described in the first to three embodiments is executed.

In accordance with the electronic device 1 according to the present embodiment, the reinforcing member 80 and the panel 10 are deformed due to deformation of the piezoelectric element 30 attached to the panel 10 through the reinforcing member 80, and air conduction sound and vibration sound are transmitted to the object in contact with the panel 10 to be deformed. Thus, air conduction sound and vibration sound can be transmitted to the user without the need of applying the vibrator itself to his/her ear. In addition, the piezoelectric element 30 is attached to the surface on the inner side of the housing 60a of the panel 10. Thus air conduction sound and vibration sound can be transmitted to the user without protruding the vibrator out of the housing 60a. In addition, for the panel 10, deformation for transmitting air conduction sound and vibration sound occurs in any portions of the panel 10 as well as in the region to which the piezoelectric element 30 is attached. Thus the user can listen to, in addition to air conduction sound transmitted through the air, vibration sound by bringing his/her ear into contact with any position on the panel 10.

Furthermore, the reinforcing member 80 is disposed between the piezoelectric element 30 and the panel 10, thus, for example, when an external force is applied to the panel 10, the possibility of damaging the piezoelectric element 30 due to the external force transmitted to the piezoelectric element 30 can be reduced. In addition, even if the panel 10 is brought strongly into contact with the human body, the vibration of the panel 10 is hardly damped. Furthermore, disposing the reinforcing member 80 between the piezoelectric element 30 and the panel 10 may decrease the resonance frequency of the panel 10 and improve the acoustic characteristics of low frequency band. Note that, instead of the reinforcing member 80, a plate-like weight may be attached to the piezoelectric element 30 with the joining member 70.

In addition, in accordance with the electronic device 1 according to the present embodiment, any of the side tone processing described in the first to three embodiments is executed based on the ambient sound collected by the microphone 7, thus in the same manner as described in the first to three embodiments, the oppressive feeling when the user's ear is covered with the panel 10 can be alleviated.

Although the present invention has been described by way of embodiments with reference to the accompanying drawings, it should be noted that various changes and modifications will be apparent to those skilled in the art. Therefore, such changes and modifications are to be understood as included within the scope of the present invention. For example, the functions and the like included in the members, units, steps, or the like may be reordered in any logically consistent way. Furthermore, units, steps, and the like may be combined into one or divided.

In addition, in the first embodiment, when the noise level is equal to or more than the threshold (Yes) in step S502 in FIG. 5, the side tone is turned off in step S504. However, without turning it off, the side tone level may be set to the level that is lower than the normal level. That is, the gain of the drive signal of the piezoelectric element 30 based on the output signal of the microphone 7 may be set to a predetermined gain that is lower than the normal gain. In addition, the setting processing of the level including such ON/OFF of the side tone may be executed in the interruption processing during telephone communication, as in the case of the third embodiment.

In the same manner, in the third embodiment, when the contact area S is S≤S1 in step S802 in FIG. 8, the side tone is turned off in step S804. However, without turning it off, the side tone level may be set to the level that is lower than the normal level.

Figure 11:
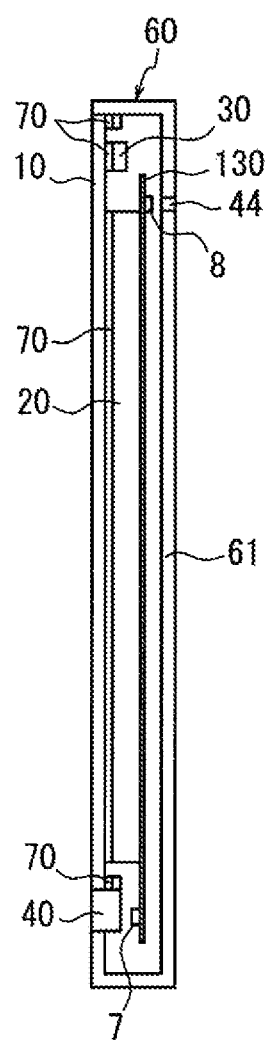
FIG. 11 is a schematic cross-sectional view illustrating a variation of a smartphone type electronic device having a sub-microphone.
Figure 12:
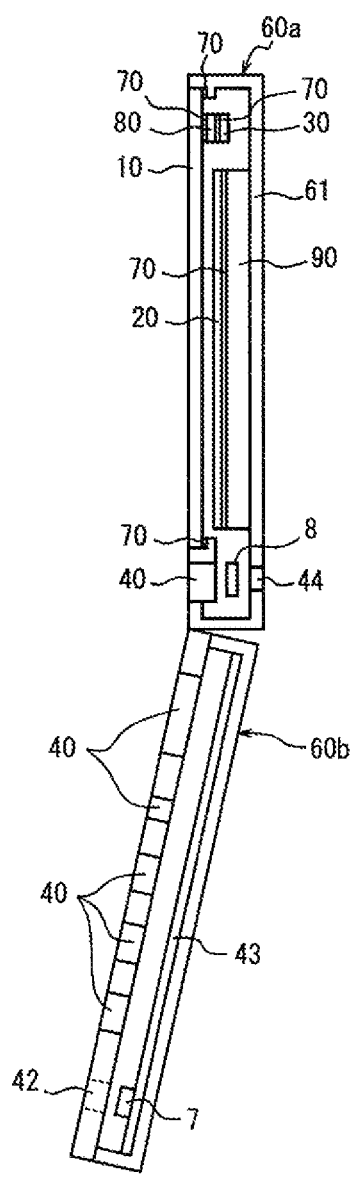
FIG. 12 is a schematic cross-sectional view illustrating a variation of a folding electronic device having a sub-microphone.

In addition, in the above-described embodiment, one microphone 7 is used for collecting both speech voice and ambient sound. However, the microphone 7 may be provided as a main microphone for speech transmission, and a sub-microphone for collecting ambient sound may be provided on a position different from that of the microphone 7. In this case, the sub-microphone may be disposed in such a manner that it has directivity on the opposite side of the microphone 7. For example, in the electronic device 1 of a smartphone type illustrated in FIG. 3, as exemplified in FIG. 11 with a schematic cross-sectional diagram, on the side on which the piezoelectric element 30 is disposed, a sound collection port 44 is formed on the side opposite to the panel 10 of the housing 60, and the sub-microphone 8 is mounted on the circuit board 130 in such a manner that the sub-microphone 8 faces the sound collection port 44. In the same manner, in the folding electronic device 1 illustrated in FIG. 9, as exemplified with the schematic cross-sectional diagram in FIG. 12, in the vicinity of the coupling part between the upper housing 60a and the lower housing 60b, the sound collection port 44 is formed on the opposite side of the panel 10 of the housing 60a, and the sub-microphone 8 is mounted on the circuit board (not illustrated) and built therein such that the sub-microphone 8 faces the sound collection port 44. Note that the sub-microphone 8 may be disposed on any position different from that of the main microphone 7 as well as the positions illustrated on FIGS. 11 and 12.

Furthermore, in the above-described embodiment, other than during the telephone communication in which the side tone is output, the side tone may be output by the user's choice.

In addition, in the configuration where the panel 10 and the display unit 20 are not overlapped with each other, the piezoelectric element 30 may be disposed in the center of the panel 10. When the piezoelectric element 30 is provided in the center of the panel 10, the vibration of the piezoelectric element 30 is transmitted uniformly throughout the panel 10, thus the quality of air conduction sound can be improved or the user can recognize vibration sound even if the user brings his/her ear into contact with various positions on the panel 10. Note that a plurality of piezoelectric elements 30 may be mounted.

Furthermore, in the above-described electronic device 1, the piezoelectric element 30 is stuck to the panel 10. However, it may be attached to a position different from the panel 10. For example, in the case of the smartphone type electronic device 1 illustrated in FIG. 3, the piezoelectric element 30 may be stuck to the battery lid covering the battery attached to the housing 60. The battery lid is often attached, in the electronic device 1 such as a mobile phone or the like, to the face that is different from the panel 10, thus, according to such a configuration, the user can listen to the sound by bringing his/her part of the body (e.g. ear) in contact with the face that is different from the panel 10.

In addition, the panel 10 can form any one of or all of a display panel, an operation panel, a cover panel and a lid panel provided for allowing a rechargeable battery to be detachable. In particular, when the panel 10 is a display panel, the piezoelectric element 30 is disposed outside the display region for display function, which provides an advantage that the display is hard to be interrupted. In the case of the smartphone type electric device 1 illustrated in FIG. 3, the operation panel includes a touch panel. In addition, in the case of the folding mobile phone illustrated in FIG. 9, the operation panel includes a sheet key, which is a member that forms one face on the operation unit side (lower side), where a key top of operation key is integrated, of the housing.

Note that, in the above-described embodiment, the joining member that attaches the panel 10 to the piezoelectric element 30 and the joining member that attaches the panel 10 to the housing 60(60a) are described as the joining member 70 assigned with the same reference numeral. However, a different joining member may be used depending on the member to be attached.

Furthermore, although the above described embodiment indicates that a contact area detection function for detecting a contact area of the contact object with the vibrator is provided, and when the contact area detected by the contact area detection function is more than a predetermined value, the vibrator is vibrated based on the ambient sound collected by the microphone, or when the contact area detected by the contact area detection function is equal to or less than the predetermined value, vibration of the vibrator based on the ambient sound collected by the microphone is stopped, the embodiment is not limited thereto.

For example, instead of the contact area detected by the contact area detection function, a pressure detection mechanism may be provided, and when the pressure detection value is more than the predetermined value, the vibrator may be vibrated based on the ambient sound collected by the microphone, or when the pressure detection value is equal to or less than the predetermined value, the vibration of the vibrator based on the ambient sound collected by the microphone may be stopped. This is because when a wide area is in contact with the vibrator, the wide area is often in contact with the vibrator with a strong pressure. In addition, this is because the oppressive feeling caused by discontinued ambient sound tends to occur when a pressing pressure against the ear is strong.

Note that, for detection of the pressure to the panel, for example, in the case of a resistive film type touch panel, its current value or resistance value may be detected, and in the case of a capacitive type touch panel, pressure can be detected easily by detecting the value of change in the capacitance.

Furthermore, in the present invention, the vibration sound transmitted by the vibrator may vibrate a middle ear or an inner ear via soft tissues of a human body, for example, an ear cartilage.

REFERENCE SIGNS LIST

1. Electronic device
5. Wireless communication unit
7. Microphone
8. Sub-microphone
10. Panel
20. Display unit
30. Piezoelectric element
40. Input unit
41. Mouthpiece
43. Circuit board
44. Sound collection port 50. Control unit
60, 60a, 60b: Housing
70. Joining member
80. Reinforcing member
90. Supporting unit
130. Circuit board

The invention claimed is:

1. An electronic device comprising:
a housing; and
a vibrator having a panel and a piezoelectric element supported by the panel; wherein
the electronic device is configured to allow a user to listen to vibration sound that is transmitted when the panel held in the housing is pressed against the user's body and a part of the user's body is vibrated,
the vibration sound is transmitted by bending the panel by the piezoelectric element such that, in a long side direction of the piezoelectric element, the portion right above the piezoelectric element protrudes most compared to its surrounding, and by vibrating the user's body in contact with the panel, and
the electronic device comprises a microphone and vibrates the vibrator to produce a side tone, and a level of the side tone is set based on ambient sound collected by the microphone.

2. The electronic device according to claim 1, wherein the vibrator can be pressed with a pressing force in the range from 3N to 10N.

3. The electronic device according to claim 1, wherein when the ambient sound collected by the microphone is equal to or less than a predetermined value, the vibrator is vibrated based on the ambient sound collected by the microphone.

4. The electronic device according to claim 3, wherein the ambient sound collected by the microphone is more than the predetermined value, vibration of the vibrator based on the ambient sound collected by the microphone is stopped or reduced.

5. The electronic device according to claim 1, wherein the electronic device has an contact area detection function for detecting an area of contact of a contact object with the vibrator or a pressure detection function, and when a contact area detected by the contact area detection function or a pressure detection value detected by the pressure detection function is more than a predetermined value, the vibrator is vibrated based on the ambient sound collected by the microphone.

6. The electronic device according to claim 5, wherein the contact area detected by the contact area detection function or the pressure detection value detected by the pressure detection function is equal to or less than the predetermined value, vibration of the vibrator based on the ambient sound collected by the microphone is stopped or reduced.

7. The electronic device according to claim 1, wherein based on the ambient sound collected by the microphone, the vibrator is vibrated with opposite phase to that of the ambient sound.

8. The electronic device according to claim 7, wherein the vibrator is vibrated by adjusting its phase, for each frequency band of the ambient sound, to be in opposite phase to that of the ambient sound.

9. The electronic device according to claim 1, wherein the electronic device has a telephone communication function and, during telephone communication by the telephone communication function, the vibrator is vibrated based on the ambient sound collected by the microphone.

10. The electronic device according to claim 9, wherein the microphone for collecting the ambient sound is a sub-microphone disposed on a position different from that on which a main microphone for speech transmission is disposed.

11. The electronic device according to claim 10, wherein the main microphone is disposed in such a manner that it has directivity on the side facing the vibrator of the housing, and the sub-microphone is disposed in such a manner that it has a directivity on the opposite side to the main microphone.

12. The electronic device according to claim 1, wherein the panel is held by the housing.

13. The electronic device according to claim 12, wherein the piezoelectric element is disposed on one end side in one direction of the housing.

14. The electronic device according to claim 12, wherein the panel is formed in a rectangular shape in planar view, and a length of one of two sides opposed to each other of the panel is equal to or more than a length from an antitragus to an inferior crus of antihelix.

15. The electronic device according to claim 14, wherein a length of other two sides opposed to each other of the panel is equal to or more than a length from a tragus to an antihelix.

16. The electronic device according to claim 12, wherein the piezoelectric element is joined to the housing with a joining member and fixed thereto.

17. The electronic device according to claim 16, wherein the joining member is a non-thermosetting adhesive.

18. The electronic device according to claim 16, wherein the joining member is a double-sided adhesive tape.

19. The electronic device according to claim 12, wherein the panel is joined to the housing with a joining member.

20. The electronic device according to claim 19, wherein the joining member is a non-thermosetting adhesive.

21. The electronic device according to claim 19, wherein the joining member is a double-sided adhesive tape.

22. The electronic device according to claim 12, wherein the panel forms a part of any of or all of a display unit, an input unit and a cover of the display unit.

23. The electronic device according to claim 22, wherein a portion on the panel where the piezoelectric element is fixed is located outside a region overlapped with the display unit on the panel in planar view.

24. The electronic device according to claim 22, wherein the display unit is fixed to the panel from inside the housing.

25. The electronic device according to claim 1, wherein the vibrator allows the user to listen to air conduction sound, in addition to the vibration sound.

* * * * *